(12) United States Patent
Jeon

(10) Patent No.: US 6,345,053 B1
(45) Date of Patent: Feb. 5, 2002

(54) METHOD OF GENERATING PROGRAM LOADED DATA IN A COMMUNICATIONS SYSTEM

(75) Inventor: Young Ki Jeon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/094,652

(22) Filed: Jun. 15, 1998

(30) Foreign Application Priority Data

Jun. 13, 1997 (KR) .......................................... 97-024561

(51) Int. Cl.$^7$ .............................................. H04B 7/216
(52) U.S. Cl. ........................ 370/441; 370/335; 455/450
(58) Field of Search ................................ 370/431, 432, 370/441, 310, 320, 328, 335, 342, 675, 522, 325, 347; 455/450, 452, 422, 435, 434, 437

(56) References Cited

U.S. PATENT DOCUMENTS 5,511,067 A    4/1996  Miller
6,131,012 A *  10/2000 Struhsaker .................. 455/452
6,161,013 A *  12/2000 Anderson ................... 455/435
6,161,022 A *  12/2000 Hwang ....................... 455/561
6,212,388 B1 *  4/2001  Seo .............................. 370/329

* cited by examiner

*Primary Examiner*—Douglas Olms
*Assistant Examiner*—Ricardo M. Pizarro
(74) *Attorney, Agent, or Firm*—Dilworth & Barrese, LLP

(57) ABSTRACT

A method creating PLD in CDMA and PCS system has the step of classifying data file according to the applied fields for each system, the step of creating the initial data file DG_INIT for all equipped systems by using the classified data, the step of creating the initial default data file in order to make the basic PLD, which is used in adding/removing systems, the step of creating relation dictionary such as key dictionary and attribute dictionary data file for each system, the step of writing the PLD header information and the relation dictionary information per each system into the main part of DG_INIT data file created in the step of creating the DG_INIT, the step of creating a list data file having information about the file needed for each system, the step of creating the PLD by using the data files created in the above steps.

13 Claims, 6 Drawing Sheets

METHOD OF GENERATING PROGRAM LOADED DATA IN A COMMUNICATIONS SYSTEM

BACKGROUND OF THE INVENTION

1. Field of the Invention

The present invention relates to wireless communications systems and, more particularly, to method of generating program loaded data (PLD) including system configuration information for use by Personal Communications Services (PCS) and Code Division Multiple Access(CDMA) systems.

2. Description of the Prior Art

As described above, the CDMA and PCS system comprise a BTS (Base station Transceiver System) supplying mobile communication service to mobile stations, BSC (Base Station Controller) relaying to and from a MSC (Mobile Switching Center) and the MSC switching a plurality of BSCs to a PSTN (Public Switched Telephone Network).

A processor for controlling the BTS is a BCP (Base Station Controller Processor) and a processor for controlling the BSC is a CCP (Call Controller Processor). The CCP manages a plurality of BCP and a BSM (Base Station Manager) manages a plurality of CCPs. FIG. 5 illustrates a typical system architecture.

It is also known that data for managing the BSM, the BSC and the BTS is referred to as program loaded data (PLD). Such PLD includes data relating to system configuration information necessary for managing the communications system, e. g.,traffic channel information necessary for performing communications in the BSM, the BSC and the BTS and for performing frequency assignment.

Since the PLD is utilized by the BSM, the BSC, and BTS, the operational program operating each system(that is, the BSM, the BSC, and BTS) is executed based on the PLD saved for each system. Accordingly, the PLD of these three systems has to be consistent with respect to each other. One reason that consistency of the PLD is important is to prevent confusion in managing the mobile telephone system connected with the three systems which may arise due to disagreement of data(PLD) which each system has saved.

A BSC stores PLD of a BTS as well as its own PLD, and in the same manner, a BSM stores PLD of the BSC and BTS.

The PLD is created from the initial data for operating system (BTS, BSC, and BSM). The structure of the initial data is called relation. Relation, for example, is information about configuration of the BTS and the BSC and lists of adjacent BTSs to one BTS. PLD has a kind of table form. The table has ID of a BSM/BSC/BTS as a key and data unit (word, byte) as an attribute. As a result, relation includes schema information of data key, attribute. This relation group is stored as a data base schema.

In a CDMA system, PLD manufacturing tool is used for creating PLD. The PLD manufacturing tool creates PLD for each system (BTS, BSC, BSM) by using the initial data and data base schema.

Typically, each time the PLD is generated, the DG__INIT file has to be in a format suitable for the system configuration architecture of the three systems. In addition, in the situation where system configuration data must be written into each different file executed by the BSM, the BSC, and the BTS, that is all files of each of these systems must be changed. However, because all BSMs, scores of BSCs, and hundreds of BTSs, included in a communications system, have there own respective system data files, each of these files must be checked to determine whether the existing data is different than the new data (i.e., confirm data) and ,if not, the existing data in each of these files is modified.

Further, it is known that, because of the nature a CDMA system, associated data must be managed commonly between the BS and the BSC in order to control the BTS. As noted above, the task of commonly managing the associated data is a complicated task because data changes require respective confirm and then, if necessary, respective modification of the data in several specific systems.

Also, because the interrelated systems of the communications system require consistency of data, an error occurring during the modification of data associated with one of the interrelated systems can cause a multitude of problems between the systems. Hence, great care is needed when performing modification of data.

Referring to FIG. 1, a block diagram illustrating a prior art method of generating PLD is shown. As illustrated, the PLD manufacturing tool, such as C compiler,generates the PLD after receiving all data files of the BSC, the BTS and each data table corresponding to the databases associated with these systems. In order to manufacture the PLD, at first a file is created whose configuration is suitable for C language structure defining the relation to be included in the PLD.

The initial data that will be included in each relation, has to be created by the processor and by the relation so that the PLD manufacturing tool (C compiler) can recognize (compile) one data file.

Further, in making each data file, the DG__INIT is created taking into account the requirement of common data between processors as well as data in accordance with the characteristics of each processor.

The method of manufacturing the PLD is completed by generating PLD__header information and compiling these files in reference to a header file that is an initial file defining the produced input data file and relation.

In case of using the method of generating the PLD as noted above, if the DG__INIT files are changed, all BSCnn__mmmm.dat files of the BSC data have to be modified. Also, in the case of changing data used commonly in all BTSs, all BTS data, that is, all BSCnn__Rel__mmmm.dat and BTSnnyy__Rel__mmmm.dat files, have to be modified. In this case, if there is much data to be changed in any *.dat files, it is difficult to find the portion to be modified in each file. To add to the complexity of the problem and difficulties associated therewith, in the case where the system configuration is modified, before the exact portion of any one file to be modified is identified, the corresponding system that requires the change must be identified and then corresponding file associated with that system, itself, must be identified.

SUMMARY OF THE INVENTION

In order to eliminate the problems noted above, as well as others, the present invention provides a method of generating PLD which facilitates change of the PLD. For example, in the case where the entire system configuration is changed or a new relation is added or a relation is changed, the present invention automates the Data-Generation Initial Data DG__INIT manufacturing process by only generating the minimum necessary data after classifying system configuration and usage data into appropriate classifications.

A method creating PLD in CDMA and PCS system is disclosed. The method classifies data file according to the applied fields for each system and creates the initial data file DG__INIT for all equipped systems (e.g., BSC, BTS) by using said classified data and creates the initial default data file in order to make the basic PLD, which is used in adding/removing systems too. The method includes the step of creating relation dictionary such as key dictionary and attribute dictionary data file for each system and the step of writing the PLD header information and the relation dictionary information per each system into the main part of DG_INIT data. And the method further includes the step of creating a list data file having information about the file needed for each system and the step of creating the PLD by using the data files created in said steps.

DETAILED DESCRIPTION OF PREFERRED EMBODIMENTS

Figure 1:
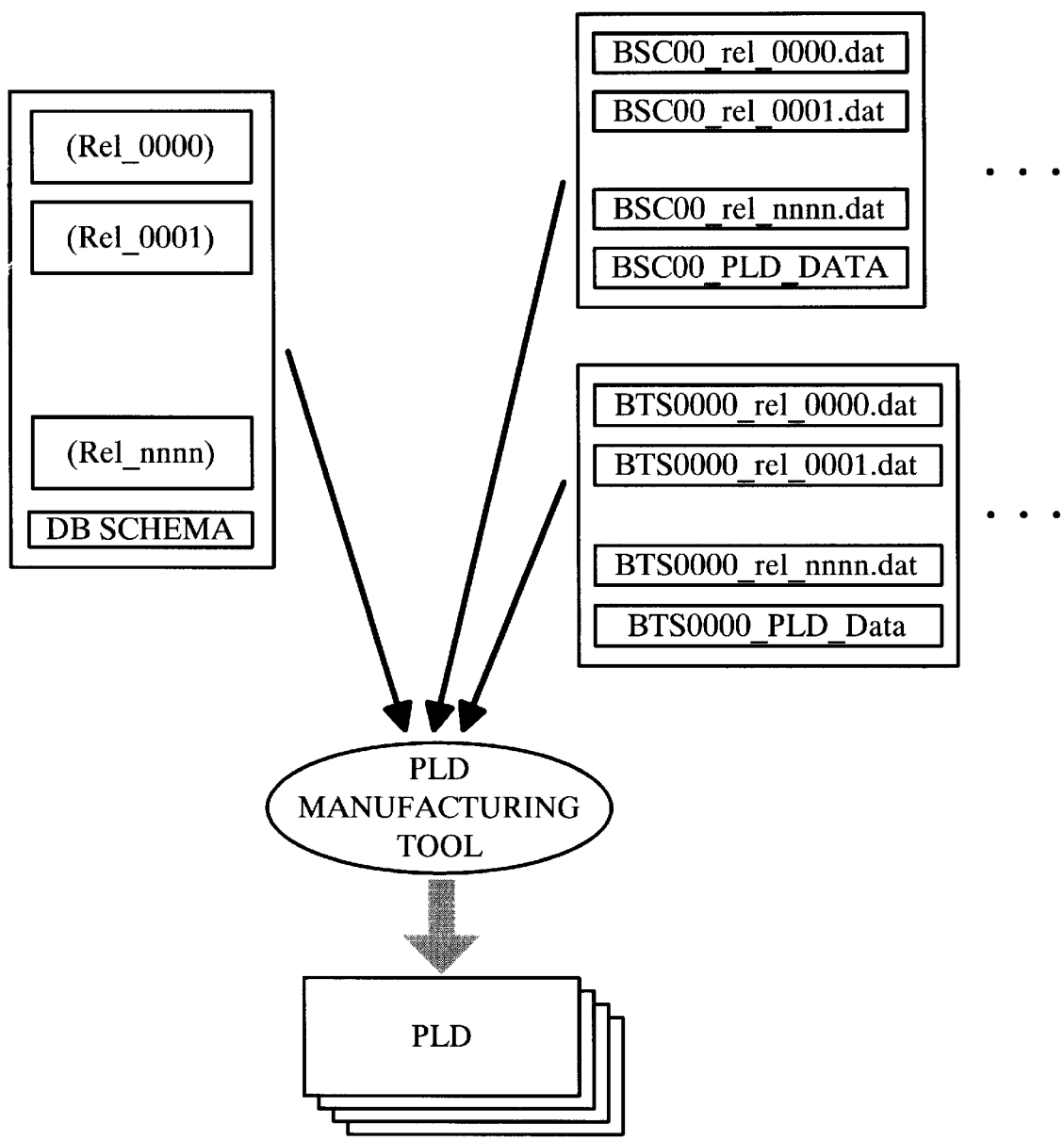
FIG. 1 is a block diagram illustrating method of generating PLD in prior art.

It is to be appreciated that a preferred method of the present invention for generating the PLD includes the steps of classifying data, to be used by each applicable system of a communications system, with a PLD relation identifier: creating an initial data file for all equipped systems(BSC, BTS); generating an initial default data file for generating standard PLD which will be used of adding/removing system afterward; creating a key dictionary and an attribute dictionary data file for each system; writing PLD header information and relation dictionary information for each system into a main part of the PLD initial data file; creating a list data file having information about the data file needed by each system; and generating the PLD by using the data files created in the above steps. Here, to be equipped means that data are equipped into the system such as BSC or BTS and hardware can be equipped as well. "Each system" and "all the systems" refer to BSC and BTS.

In order to create an initial data file for generating the PLD file by the invention, each data files are classified into data that have to be applied by each system, according to the system configuration and the management information. The data files are classified by each system in accordance with applicable fields as following. data file for only BSM: a data file for saving the equipment status of all the BSCs under BSM and the information for the neighboring cell of a BTS. data file for only CCP: a database for hardware a hardware configuration used exclusively in a BSC. data file for only BCP: a data file for a hardware configuration and usage used only in a BTS. common data file of all CCPs and BCPs: information about all BTS in a MSC for controlling each BTS, being applied commonly to all BSCs and including data related to itself. common data file of all CCPs: a data file used for controlling each BS in all BSCs. common data file of an upper CCP and a lower BCP:

Next, each data file, as divided above, is classified by a PLD relation as follows: DB schema: data for defining the key information and the attribute information of relation. common header: symbol data used commonly in the whole system. system common It is data, which have to be applied commonly. network common: data applied commonly in a MSC, i.e., a network, and having information about all equipped BSCs in the MSC. BSCxx.conf: data for hardware configuration associated with a BSC wherein an ID is xx, and which includes information about the equipped BTSs under the BTS. BTSxxyy.conf: data for hardware configuration associated with the BTS wherein an ID is xxyy. BTSxxyy.plan: data for cell plan such as deciding position of BTS wherein an ID is xxyy. BTSxxyy.nebr: data concerning information for neighboring cells of a BTS is xxyy. default data: data applied as default for the omitted data in each data file. DG_INIT: data used commonly in all systems for applying to application program.

In the first step of the invention, for writing previously minimum data needed for modifying of the PLD after classifying data files according to the relation as above, it is possible to manage data automatically by using a special tool. In the first step of the invention, it is possible to automatically manage data by using other tool after classifying data files according to relation and previously making the minimum data needed for modification of the PLD as described above. That is, only data file corresponding to the changed system among classified data is modified. And only the relation of corresponding data file according to the changed relation is necessary to be modified. In the second step, the initial data file for all equipped systems is created.

Figure 2:
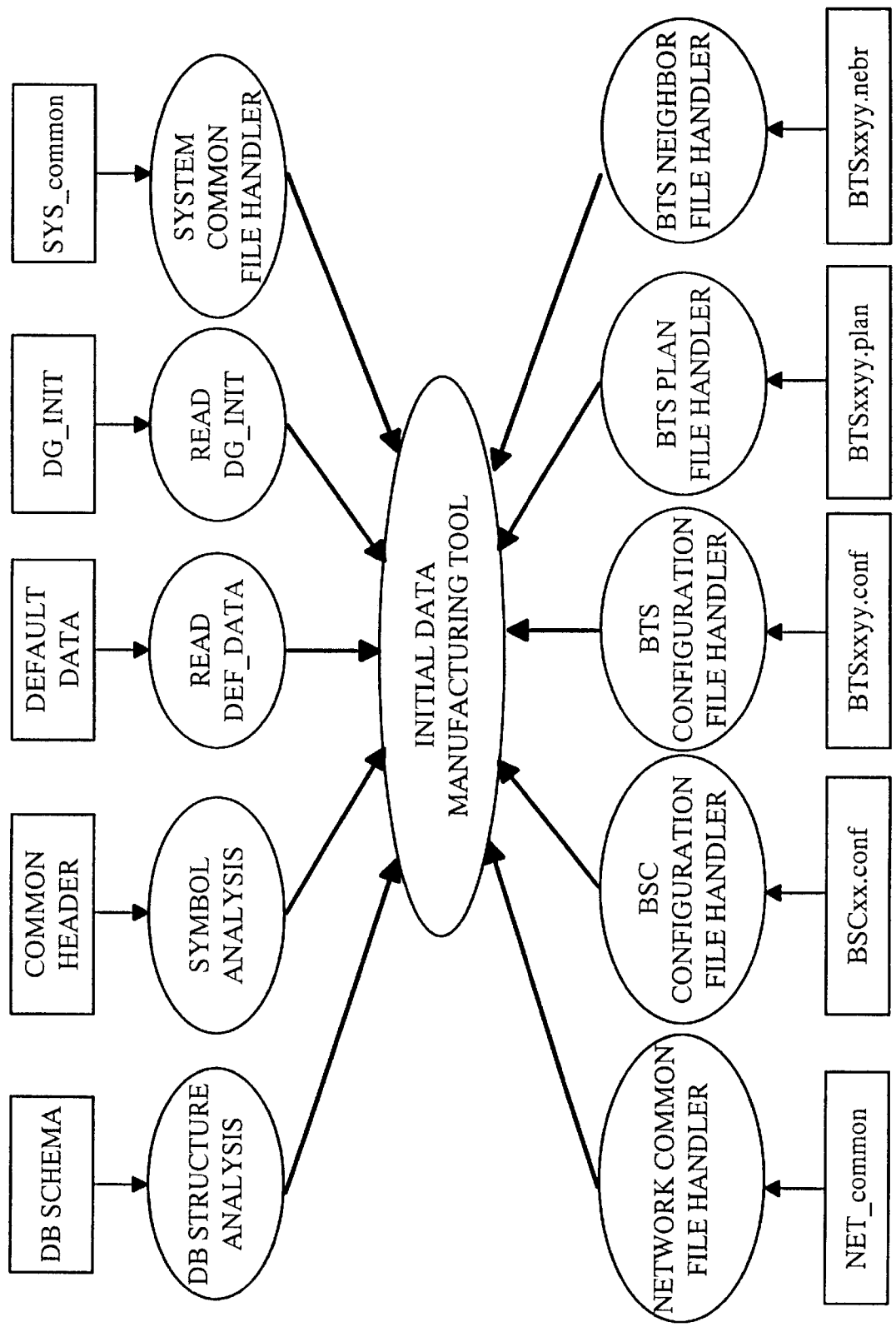
FIG. 2 is a diagram illustrating a basic architecture for generating initial data according to the present invention.

FIG. 2 illustrates a basic architecture for generating the initial data file according to the present invention. As illustrated, the tool making the PLD classifies all data files, that are used for each systems of the communications system, using relation identifier REL_ID.

In accordance with relation, data files are classified as either DB schema, a common header corresponding to the first part of all data, default data, DG_INIT, SYS_common data, NET_common data, BSCxx.conf, BSCxxyy.conf, BTSxxyy.plan and BTSxxyy.nerb. Accordingly, it is possible to input minimum data suitable for system configuration by applicable field classified as above. In case of inputting the minimum data suitable to system configuration according to application fields classified as above, it is possible to omit data inputting by using default data. The detailed steps of classifying data and establishing the applicable field of data that is explained below in the context of FIG. 2.

First, a definition content is read from DB schema defining the access method by relation and the C structure type file defining relation, and the key information and the attribute information for classified data saved into memory.

Next, symbol data are read from the common header which is used commonly in the entire system, arranged and stored in memory so as to be used in the relation data generate d initial data DG-INIT. The default data that can be used for default on most PLD when saving the data is read and then written to memory to simplify the procedure for the data to be re-written by each processor.

Next, we read the DG_INIT classified as contents unnecessary to write besides in each processor as data used in the application program, and save it into the memory.

SYS.common data defining the management data by operator managing each system, is read and saved into the memory. These data have to be used as the same value in each system.

Further, the NET_common data, describing the common data in a MSC, is read and then saved into the memory. This data must have the same value in files of all systems (BSM, BSC, and BTS) under control of the MSC.

Then, we read the data about the hardware configuration of all present equipped BSCs and save as BSCxx.conf, in reference to the BSC information among data read from said NET_common data.

At first the equipped BSC is grasped from BSCxx.conf, and the hardware configuration data of the equipped BTSs of the BSC, are read and saved into the memory.

The presently equipped BTS is grasped from said BSCxx.conf and the data related to the hardware configuration about the lower and equipped BTS is read from BSCxx.conf and stored in the memory.

The presently equipped BTS is grasped from said BSCxx.conf and the cell plan data about the lower and equipped BTS cell is read from BTS.xxyy.plan and stored in the memory.

We use those to the cell plan such as cell position decision, as grasping cell usage status and overlapping status with adjacent cells, through said BTSxxyy.nebr. Also we read the adjacent cell information about the equipped BTS from BTSxxyy.nebr and save into the memory. Cell management status and overlapping status with neighboring cells that are checked through the BTSxxyy.plan, are used for cell plan such as decision of cell position.

Through the steps as above, the minimum data suitable for the system configuration by the applicable field are inputted. Then it is possible to input only the minimum data suitable to system configuration according to applicable fields classified as above, and omit data inputting by using default data.

Figure 3:
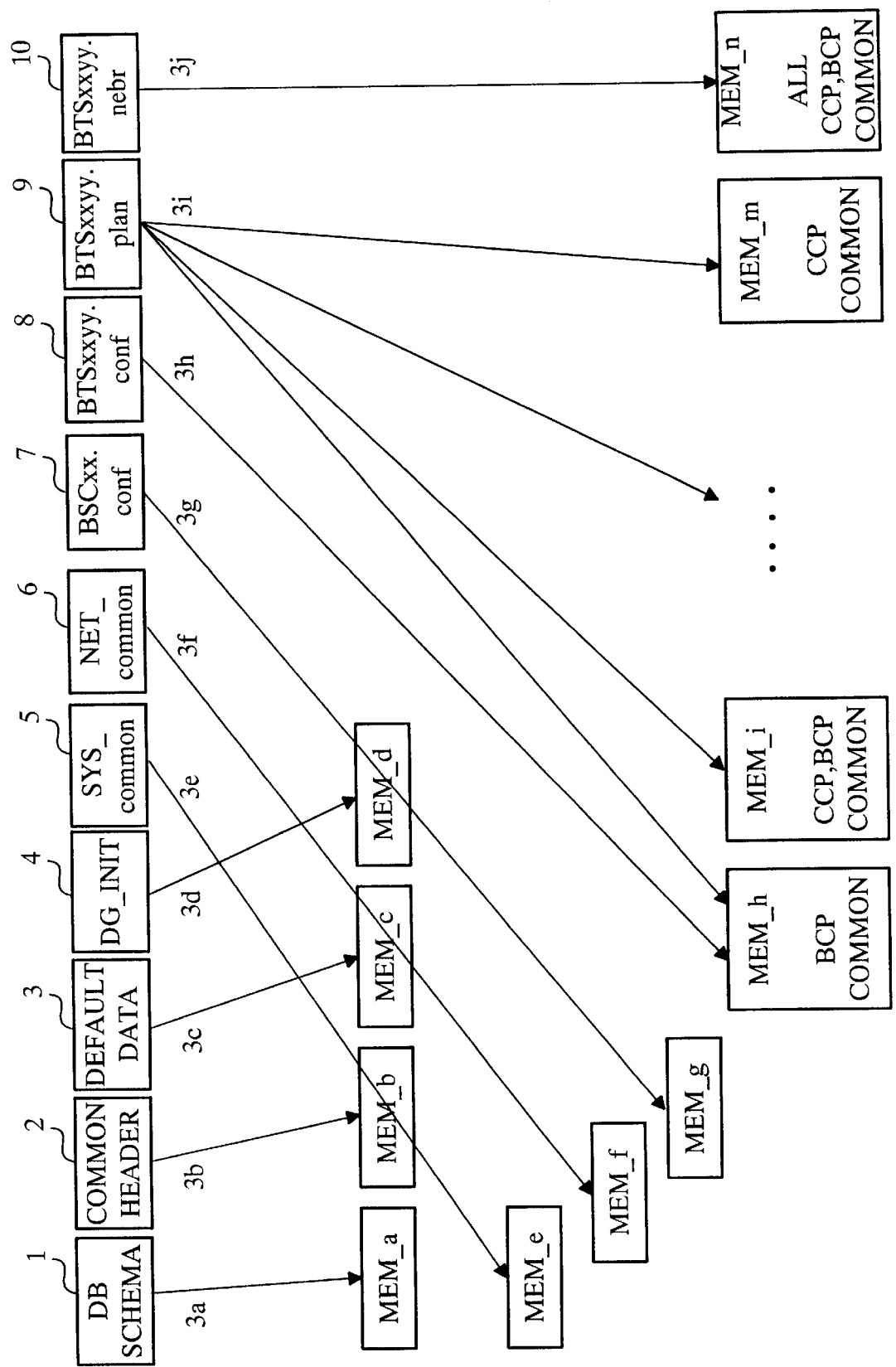
FIG. 3 is a diagram illustrating steps of generating initial data suitable for the system configuration by the applicable field.

FIG. 3 illustrates steps of creating the initial data suitable for the system configuration by the applicable field. As illustrated, the processes for saving the data according to the characteristics of each item are explained step by step in detail as follows, wherein said data were classified in said FIG. 2.

PLD manufacturing tool reads(3a) DB schema(1) which are data defining DB schema and saves into MEM_a. In this step, it generates the architecture for making the PLD by system, the attribute type, the size information and the key information for each relation. It reads(3b) the common header data(2) used in the application program so that symbols used in application program can be used in the PLD input data file, arranges each symbol in order and saves into the MEM_b. In case of omitting all kinds of data, in order to apply to items which are not described basically in the input data file, it reads(3c) the default data(3) and saves into the MEM_c. The default data are values for being applied to each real usage data, that is, BTS.conf.DEF, BTS.plan.DEF, BSC.conf.DEF and BSC.plan.DEF. We read (3d) the DG_INIT(4) defining values used as the initial data in the application program and save into the MEM_d.

We read data defined for each service provider through the following steps after reading basic input data as above. First, we read(3e) the SYS.common data(5) defining data applied commonly as separately defining by service provider and save into MEM_e. We read(3f) the NET_common data(6) defining data commonly applied to all BSCs and BTSs under a MSC, and save into the MEM_f. In reference to information about the equipped BSC from contents in the MEM_f, we read the equipped BSC configuration and parameter data from BSCxx.conf data(7) and save into the MEM_g.

The content included in the MEM_g includes hardware equip information for composing each BSC and the information about equipped/nonequipped status of the BTSs under the BSC. After reading all information about the equipped BSC recorded in the MEM_f, we read the information about the BTSs under each BSC. The BTS information is divided into configuration data, cell parameter, usage data and adjacent cell information and processed. The equipped BTS information is obtained from the MEM_g, and then BTSxxyy.conf, BTS xxyy.plan and BTSxxyy.nebr information are processed separately.

We read(3h) the configuration information for the equipped BTSxxyy.conf(8) and saves into the MEM_h where is data area of only BTS. We read(3i) said BTSxxyy.plan(9), in case of the data of only BCP by each data, saves into MEM_h area, and in case of the CCP and BCP common data, save into the corresponding memory established by each relation among from the MEM_i to the MEM_m.

Now, we read(3j) the BTSxxyy.nebr(10) data of the adjacent BTSs and save into the MEM_n for managing the adjacent cell information. When reading data for the whole configuration of BSC in the MEM_f and BTS in the MEM_g, in case that there is the items omitted by each item, it replaces the content of MEM_h, the MEM_i, the MEM_j with the contents MEM_c where the default data(3) are saved. When writing the values by each item into the memory, in that case of using the symbol in the common header(2) the values corresponding to said common header are found from the MEM_b, converted as decimal and replaced. Through said steps as noted above, if we read an information of all BSCs and BTSs information used in a MSC, the PLD is generated via the information.

Figure 4A:
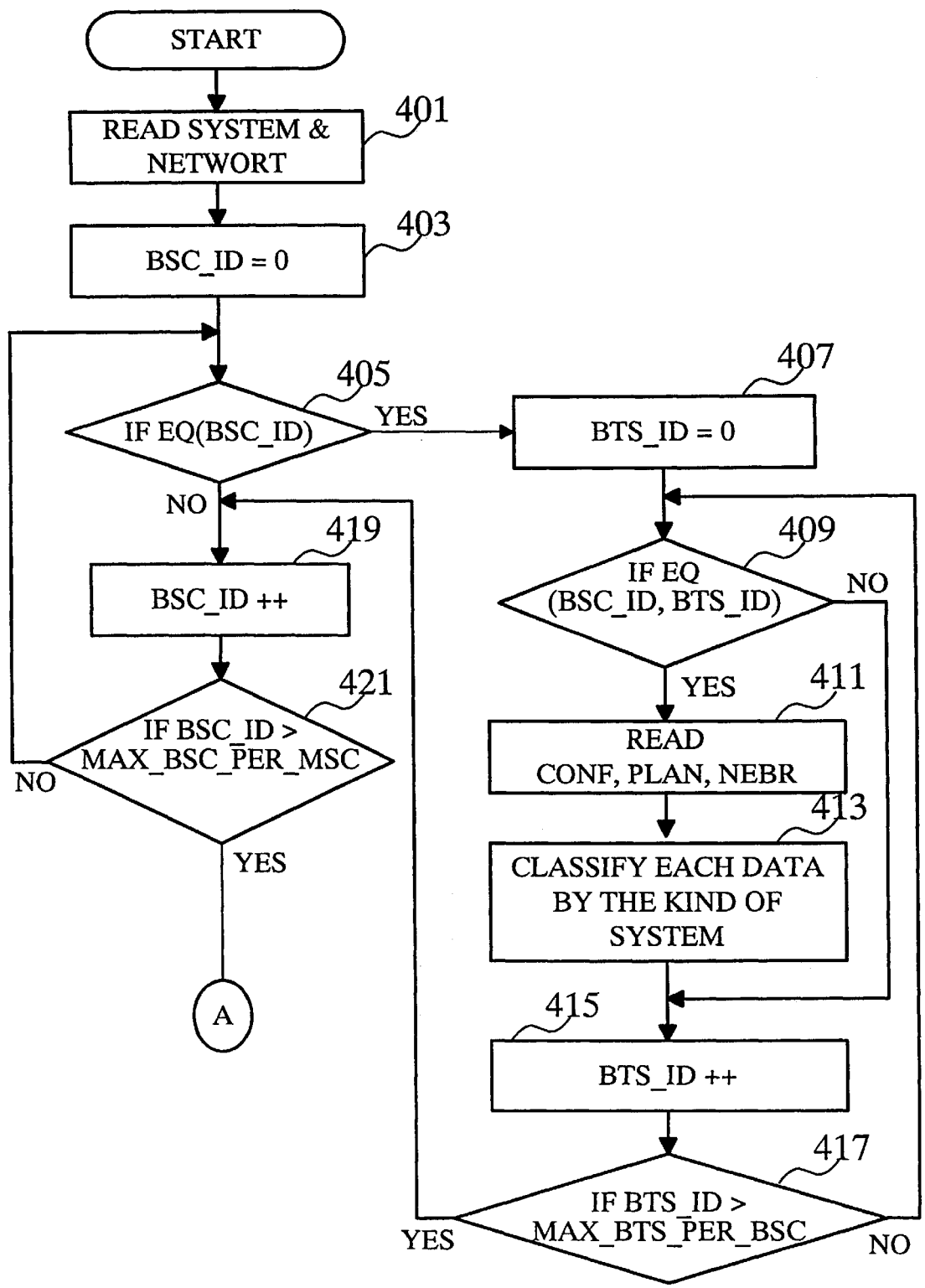
FIGS. 4A and 4B are a flowchart illustrating steps of generating initial data suitable for a system configuration by an applicable field.
Figure 4B:
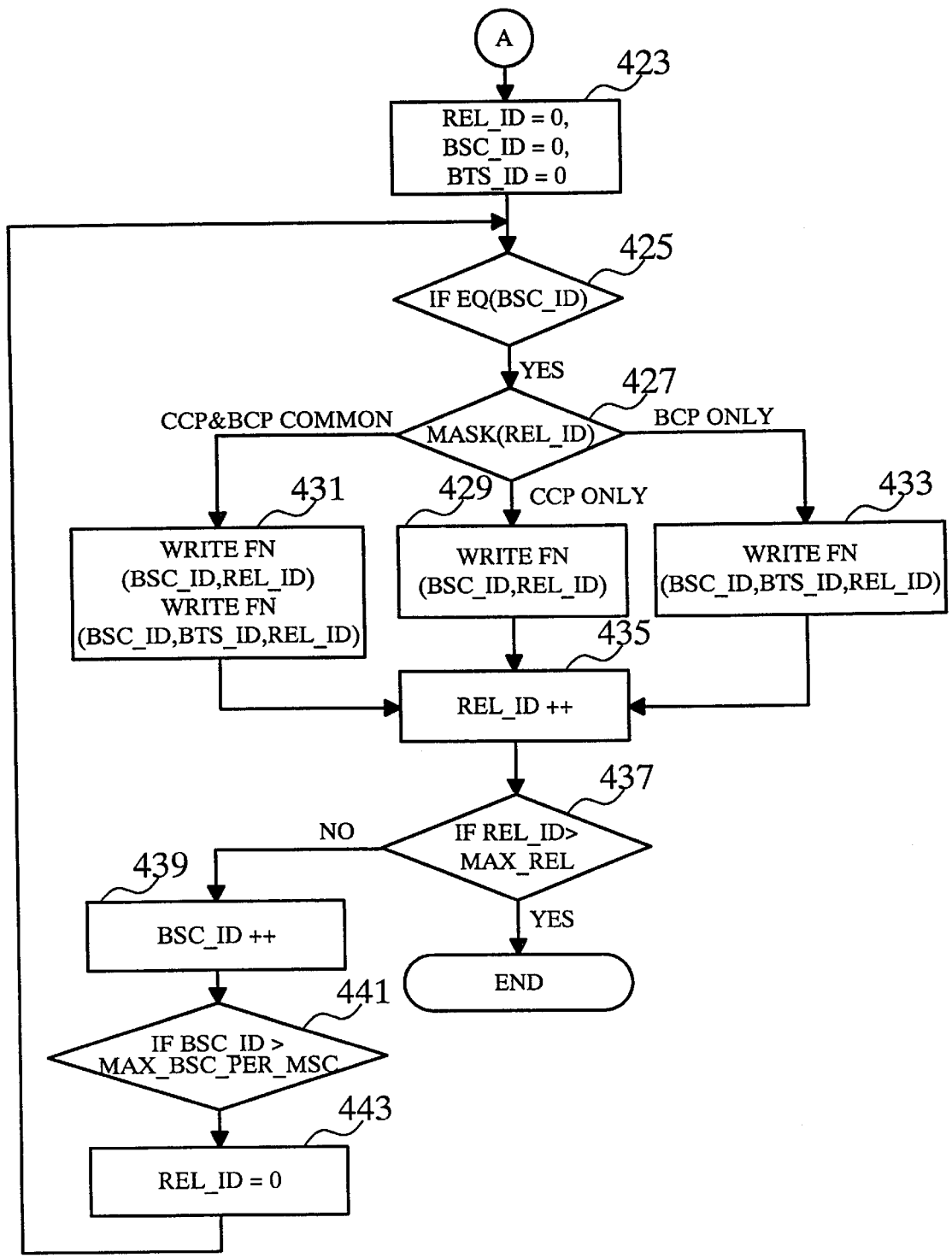
Figure 5:
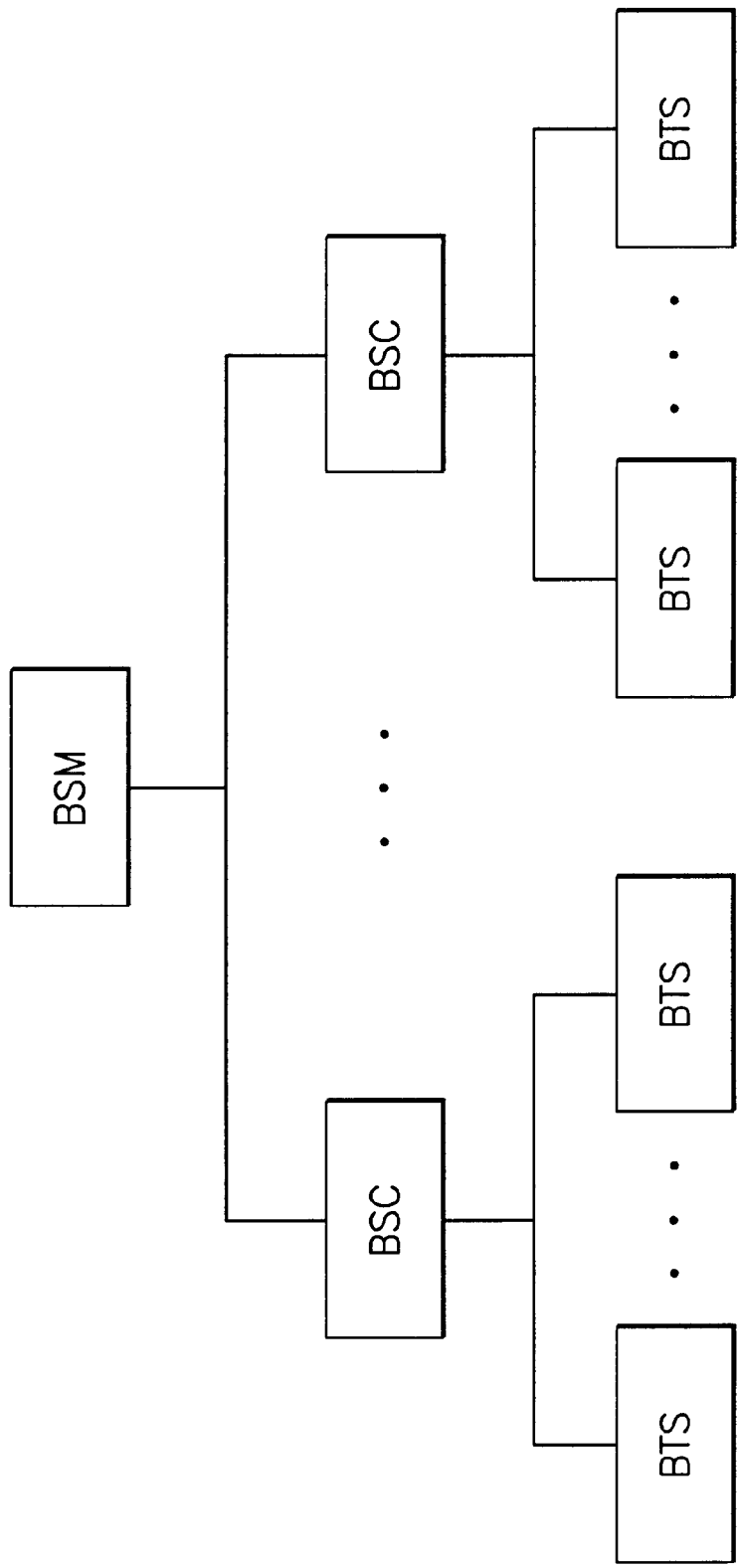
FIG. 5 is a block diagram illustrating a typical communications system architecture.

FIGS. 4A and 4B illustrates a flow chart showing the steps of making the DG_INIT suitable for the system configuration by the applicable field. As illustrated, it is composed of the step of saving as the DG_INIT data, by reading the SYS.common data and the NET.common data, the step of reading the hardware configuration information, the cell plan information and the adjacent cell information for all BTSs in the present equipped BSC, the step of classifying the reading data by each system, the step of writing the information into the corresponding relation by each system and relation if all data are classified.

The steps of constructing the PLD manufacture environment composed as above will be explained as following.

First, the system common data and the network common data are read and saved as initial data(401), i.e., data(1) defining the DB schema and the NET_common data(6) which has decided the system information for the MSC, are read and the initial environment is made.

After initializing the BSC_ID as 0(403), if agreeing with the identifier of the BSC to want to set up at present(405), it sets up the BTS_ID of the BS as 0(407).

If agreeing with the identifier of the BTS to want to set up at present(409), it reads the BSC00.conf, BTS0000.conf, BTS0000.plan and BTS0000.nebr files that are data for the BTS(411).

And then it classifies the read data files into the all CCP and BCP common data, the common data between all CCPs, the upper CCP and lower BCP common data, CCP only data, BCP only data and the BSM only data, etc(413).

The data classified through the steps as above are saved into the memory in consideration of the data classification for the input data type and the PLD manufacture. And then, the hardware configuration data which are applicable to each system independently, are initialized per system, and writes into each system data.

Also, the MSC data related to network are classified after reading all BS data, are applied to the data files according to the BSC and BTS when generating initial data.

The items omitted in the input data among the initial data files generated for manufacturing the PLD are generated by the using the default data(3) and the initial data DG_INIT (4).

In the end of the data classification, after increasing a BSC_ID(415), if the increased BTS_ID isn't bigger than the maximum number of BTS in the BSC, said reading and classifying procedure is repeated after reading data files corresponding to each system. If the BTS_ID is bigger than the maximum number of BTS(417), after increasing BSC_ID by one(419), said reading and classifying data per each BTS is repeated.

If the increased BSC_ID is bigger than the number of the maximum BSCs in the MSC, the files for the BTSs in all BSCs are completed(421).

If the DG_INIT file for all BTSs is generated, it makes possible to use as the DG_INIT in making the PLD by applying to the system according to data classified by the relation identification REL_ID.

It will be explained in reference to FIG. 4B as following.

At first, it initializes the REL_ID, the BSC_ID and the BS_ID as 0(423).

By using relation information, that is, database architecture information stored in the MEM_a, the REL_ID is masked with the present REL_ID(425) and the present data is classified.

Each data operates in accordance with the masking result as following(427). If the present data are the data used only for CCP, it writes the data related corresponding system into the file having the corresponding BSC_ID and REL_ID, in reference to the BSC list stored in the MEM_f(429), i.e., the present relation position of the present BSC data about the equipped BSC.

If the present data are all CCP common data or all CCPs and BCPs common data, at first, it writes the related data that will be put in the all BSCs commonly, into the files having the corresponding BSC_ID and REL_ID(431).

Also it writes the data related to the corresponding BS into the files having the corresponding BSC_ID, the BTS_ID and REL_ID, about the equipped BTS in reference to the MEM_f where the NET_common data(6) are stored.

If the present data are only BCP, after finding the equipped BSC from the MEM_f where the NET_common data(6) are stored, it finds the equipped BTS by reading the MEM_g where the hardware configuration data(7) of the corresponding BSC are stored.

It writes only data related to the corresponding BTS into the file having the corresponding BSC_ID, BTS_ID and REL_ID(433).

If had written the contents into the corresponding relation according to the kind of data, it increases REL_ID by one(435). If the increased REL_ID isn't bigger than the maximum number of relation(437), it increases BSC_ID by one(439).

If the increased BTS_ID isn't bigger than the maximum number of BSC in MSC(441), the relation identifier REL_ID is initialized as 0 (443) and then the step (425) is performed again.

If the present REL_ID is bigger than the maximum number of relation, it finishes the program because the initial data files for BTSs in the all equipped BSCs are completed.

The initial data files for all equipped systems are generated through the steps as above.

In said third step, it makes the initial default data file for making the standard PLD which will be used in adding/removing system afterward in reference to the MEM_c where the default data(3) are stored and the MEM_a where the DB schema(1) is stored.

In said fourth step, it generates the key dictionary data and the attribute dictionary data by each system, by using the DB schema in the MEM_a.

Also, in said fifth step, it writes the PLD header information and the relation directory information by each system into the main part of the PLD initial file.

In said sixth step, the information about the file list, which has to be used for making the PLD of each BSC, and BTS is used as the reference data for making the object PLD to be made by saving into the extra file.

If the PLD is made by said steps, the number of total files needed by each system is so many such as math expression 1.

$$\{(BSC\ number) \times (CCP\ related\ relation\ number)\} - \{(BSC\ number-1) \times (CCP\ common\ relation\ number)\} + \{(BTS\ number) \times (BCP\ related\ relation\ number)\} \quad [\text{math expression 1}]$$

But if the DG_INIT file is generated by said steps, it makes possible to make the object PLD as modifying only the DG_INIT file of system influenced by input data modification, and the time could be reduced according to modification of input data.

In case that the PLD manufacture environment is UNIX systematization, the manufacture time is reduced by the method generating the initial file because the real compiled PLD by each system become a.out type of file according to using the C compiler as a PLD manufacture tool.

That is, we make the data file capable of generating the PLD (p_sym_table) of a type of data file, after converting the name assigning characteristics by each attribute into string by using the DB schema saved into the MEM_a.

A compiler, an application program is used in order to access directly to the application program of subsystem of BSC and BTS, by using the generated PLD input data file.

In the present invention, as classifying data domain into BSC and BTS by using the method making the PLD composed as above, it makes possible to ease to make the DG_INIT for the PLD manufacture and to use data continuously after configuration modification according to making each data, in no relation with system configuration. Also if we use the method making the PLD by the present invention, it could use the prior data in case that the PLD architecture is changed or new relation is added/removed.

What is claimed is:

1. A method for creating a program loaded data (PLD) which is necessary for managing a mobile communication system comprising:

classifying the data as a plurality of fields to be used by each equipped system of the mobile communication system;

creating an initial data file (DG_INIT) for each equipped system by using said classified data;

creating an initial default data file for generating a standard PLD to add/remove each system;

creating a relation dictionary data for each system;

inserting a PLD header information and the relation dictionary data into the initial data file;

creating a list data file to generate the PLD corresponding to each system; and generating the PLD for each system.

2. The method according to claim 1, wherein said classified data comprises:

data base (DB) schema corresponding to data for defining a key information and an attribute information;

a common header corresponding to data commonly used in each system;

default data used as a default, in the case where other inputs are omitted in each data file;

DG_INIT commonly used in all systems and used in an application program;

SYS_common data commonly applied to all systems (BSC, BTS);

NET_common data, commonly applied in one MSC network;

BSCxx.conf corresponding to hardware configuration data of a BSC, wherein an ID is xxyy;

BTSxxyy.conf corresponding to hardware configuration data of a BTS, wherein an ID is xxyy;

BTSxxyy.plan corresponding to data for a cell plan of a BTS, wherein an ID is xxyy; and BTSxxyy.nebr corresponding to information data for adjacent cells of a BTS, wherein an ID is xxyy.

3. The method according to claim 1, wherein the step of creating an initial file further comprises:

reading a SYS.common data and a NET_common data and storing them as the initial data file;

reading a BSCxx.conf information, a BTSxxyy.conf information, a BTSxxyy.plan information and a BTSxxyy.nebr information about all BTSs under an equipped BSC and storing them in data files;

classifying said data files for each system; and writing information into each relation of classified data file corresponding to each system, once all data files are classified.

4. The method according to claim 1, wherein said classified data comprises:

a common data file corresponding to information about a call control processor (CCP) for controlling a base station controller (BSC) and a BTS control processor (BCP) for controlling a base transceiver station (BTS) in the mobile communication system;

a common data file corresponding to data used for controlling each base station of all base station centers (BSC's);

a data file corresponding to a hardware configuration exclusively used in a base transceiver station (BTS);

a data file corresponding to a hardware configuration exclusively used in a base station center (BSC); and a data file corresponding to status information of each system in the mobile communication system.

5. The method according to claim 1, wherein said step of creating a relation dictionary data includes writing the data related to all presently equipped BSCs into a corresponding file in case that data files classified by system are data for only call controller processor (CCP).

6. The method according to claim 5, wherein said data that relates to all equipped BSCs can be found in reference to NET_common data.

7. The method to claim 1, wherein said step of creating a relation dictionary data corresponds to writing the whole data related to all presently equipped BSCs into a corresponding file if data files classified for each system are common data files of all CCPs.

8. The method according to claim 1, wherein step of said creating a relation dictionary data corresponds to writing the whole data related to all presently equipped BTSs in reference to NET_common data into each file if data files classified for each system are common data files of all CCPs.

9. The method according to claim 1, wherein said step of creating a relation dictionary data corresponds to writing the whole data related to all presently equipped BSCs into a corresponding file if data files classified for each system are all CCPs and BCPs common data files.

10. The method according to claim 1, wherein said step of creating a relation dictionary data corresponds to writing the whole data related to all presently equipped BSCs in reference to NET_common data into a corresponding file if data files classified for each system are common data files of all CCPs and BCPs.

11. The method according to claim 1, wherein said step of creating a relation dictionary data corresponds to writing the whole data related to the BTS under all presently equipped BSCs in reference to NET_common data and BSCxx.conf into a corresponding files if data file classified for each system are data files for only BCP.

12. The method according to claim 1, wherein the initial default data file is provided from a DB schema and default data.

13. The method according to claim 1, wherein the relation dictionary data refers to one of both a key dictionary attribute and a attribute dictionary data, which are provided from a DB schema.

* * * * *